July 4, 1961  J. G. ABSALOM  2,990,847
FLUID FLOW REGULATOR
Filed May 25, 1959
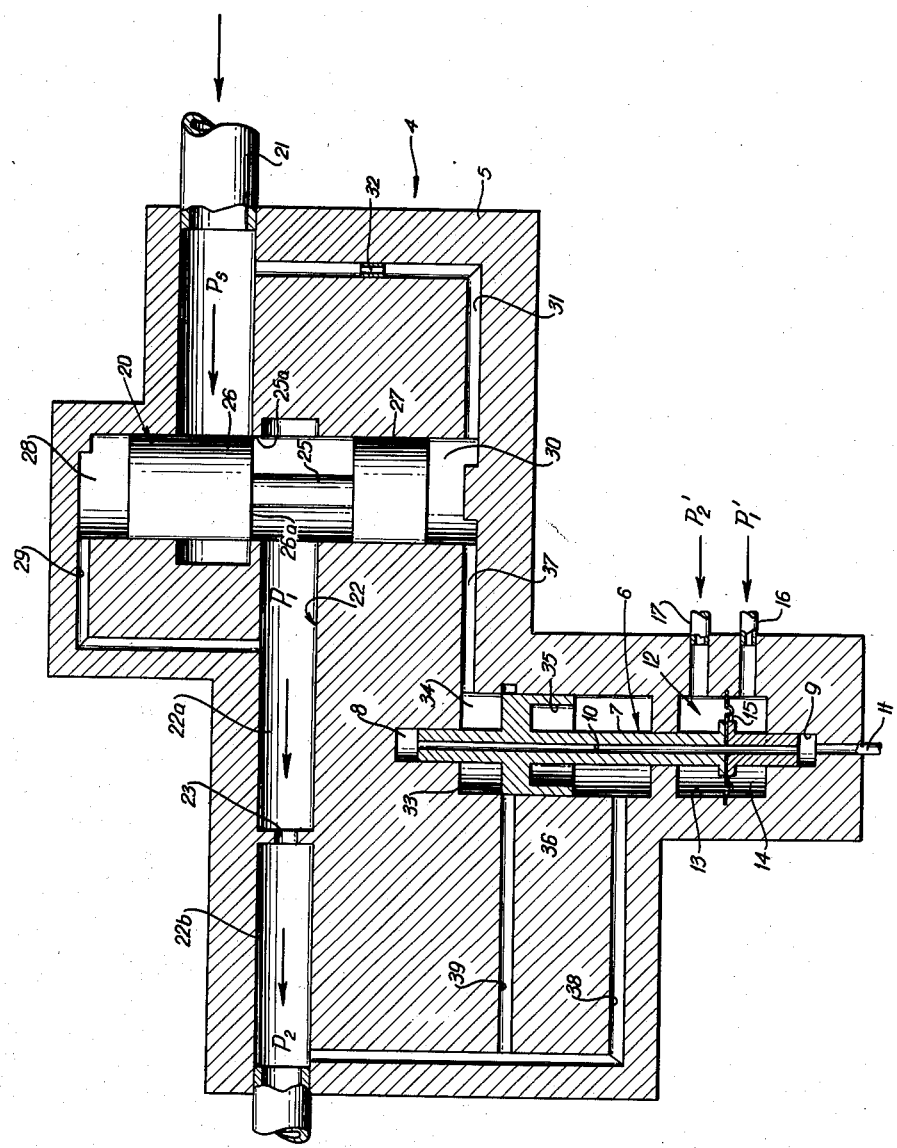
INVENTOR.
JAMES G. ABSALOM
BY
*R. E. Geauque*
Attorney

United States Patent Office 2,990,847
Patented July 4, 1961

2,990,847
FLUID FLOW REGULATOR
James G. Absalom, Canoga Park, Calif., assignor to The Marquardt Corporation, a corporation of California
Filed May 25, 1959, Ser. No. 815,483
7 Claims. (Cl. 137—489)

This invention relates to a fluid flow regulator and more particularly to a fluid flow regulator which compares a command input pressure signal with the flow output in a simple and direct manner.

Fluid flow regulators are presently utilized in a wide variety of applications, such as in the fuel system of jet engines, and some present regulators utilize differential pressure devices to control regulator valves in order to maintain a flow rate which is some known function of the pressure differential delivered to the flow regulator. In the present invention, the flow rate is continuously measured and compared with the command pressure signal to maintain the desired relationship between these quantities. At any constant command signal, the fluid flow rate is maintained constant under conditions of variable fluid supply and back pressure.

The regulator includes a servo valve which receives on opposite sides of one diaphragm, two command pressures $P_1'$ and $P_2'$, with $P_1'$ being greater than $P_2'$, and which receives on one side of a piston, a pressure $P_2$ involved in the measurement of the fluid flow. The other side of the piston is connected with the fluid supply pressure $P_s$ through a restriction and movement of the piston regulates flow through a passage in order to develop on the other side of the piston a pressure $P_1$ which will balance the pressures $P_1'$ and $P_2'$ acting on the diaphragm and the pressure $P_2$ acting on the piston.

The fluid flow is controlled by a flow control valve connected with the supply pressure $P_s$. One end of the flow control valve receives the pressure $P_1$ developed by the servo valve while the other end of the valve receives the pressure downstream of the valve. When the two end pressures are in balance, the pressure downstream of the valve is equal to the pressure $P_1$ developed by the servo valve. The downstream flow passage has means for producing a pressure drop from $P_1$ to $P_2$ and this pressure drop is a function of fluid flow. It is apparent that when the servo valve is in balance, $P_1-P_2=P_1'-P_2'$ so that the pressure drop $P_1-P_2$ which determines the flow rate is always proportional to the difference in command signals.

It is therefore an object of the present invention to provide a fluid flow regulator which continuously measures and compares the flow output with the input signal and maintains the desired relationship between fluid flow and the input signal.

Another object of the invention is to provide a fluid flow regulator which maintains a constant fluid flow rate in response to a constant command signal, regardless of variation in supply pressure and back pressure.

A further object of the invention is to provide a fluid flow regulator having a servo valve for producing a pressure $P_1$ which acts against a flow control valve to control the flow rate.

These and other objects of the invention not specifically set forth above will become readily apparent from the accompanying description and drawing which diagrammatically illustrates the flow control valve and servo valve for one form of the invention.

The fluid flow regulator 4 of the present invention comprises a body member 5 containing the various valve compartments and flow passages. The servo valve 6 comprises a central stem 7 slidably supported at its ends in spaces 8 and 9 in the member 5, and the stem 7 contains a central passage 10 so that fluid leaking into space 8 can pass to space 9. Also, space 9 connects with a drain 11 so that fluid will not be trapped in spaces 8 and 9 and interfere with movement of the servo valve and so that forces acting on the valve stem will remain balanced and will not participate in the functioning of the valve. A compartment 12 is divided into spaces 13 and 14 by a flexible diaphragm 15 connected with stem 7. Passage 16 introduces one of the command pressures $P_1'$ to space 14 and passage 17 introduces another command pressure $P_2'$ to space 13. Thus, the command signal to the regulator is the differential between pressures $P_1'$ and $P_2'$, with $P_1'$ always being the greater of the two, and both pressures can be variable or either pressure can be a constant in which case the command signal is the differential between a variable pressure and a fixed reference pressure.

The fluid flow is introduced to the flow control valve 20 from passage 21 at supply pressure $P_s$ and valve 20 restricts the flow from passage 21 to passage 22 to introduce a pressure drop from the pressure $P_s$ in passage 21 to the pressure $P_1$ in passage 22. Also, the passage 22 downstream of the flow control valve 20 contains an orifice or restriction 23 which divides the passage into portions 22a and 22b. The restriction introduces a pressure drop from pressure $P_1$ in portion 22a to pressure $P_2$ in portion 22b and this pressure drop is a function of fluid flow rate and varies very nearly as the square of the flow rate. If the passage 22 downstream from the control valve is properly sized and has sufficient length, the restriction 23 can be omitted, and the pressure drop will be very nearly a linear function of flow rate. In either case, the pressure drop from $P_1$ to $P_2$ is used as a measure of the fluid flow rate through the regulator.

The flow control valve 20 has a reduced central portion 25 and two enlarged end portions 26 and 27 which are slidable in openings in the body member 5. Regulation of fluid flow through the valve 20 is accomplished by the coaction between the lower surface 26a of portion 26 and the opening 25a in body member 5. A space 28 at the end of valve portion 26 is continuously in communication with the pressure $P_1$ in passage portion 22a through a passage 29. Also, a space 30 at the end of valve portion 27 is continuously in communication with the supply passage 21 through passage 31 containing a restriction 32. A compartment 33 in member 5 is divided into spaces 34 and 35 by a piston 36 rigidly connected to the stem 7 of servo valve 6 and the space 34 is connected with space 30 by passage 37. The space 35 is connected to the pressure $P_2$ in portion 22b by line 38, and the fluid discharge from space 34 to passage portion 22b is through passage 39, the end opening of which is controlled by the piston 36.

It is therefore apparent that a small flow of fluid is bypassed around the flow control valve 20 through the orifice 32, space 30 and space 34 to the passage 39 communicating with pressure $P_2$ and that the quantity of fluid flow is controlled by servo valve 6. The fluid pressure in space 34 acts against one side of piston 36 while the pressure $P_2$ in space 35 acts against the other side of the piston. Since the piston 36 controls the flow out of space 34, it also controls the fluid pressure in space 34 so that the fluid pressure is a function of the flow area of orifice 32 and the flow area controlled by the piston 36 of servo valve 6. When fluid is flowing through space 34, the servo valve will position itself to maintain a balance among the forces acting on the valve, and the fluid pressure in space 34 will assume a value which balances the forces exerted on the valve by the pressures $P_1'$, $P_2'$, and $P_2$. Since the cross-sectional areas of diaphragm 15 and piston 36 are equal, the balancing pressure in space 34 will be maintained at $P_1'-P_2'+P_2$.

The pressure in space 30 is equal to the pressure in space 34, and since the end areas of valve portions 26 and 27 are equal, the fluid forces acting on flow control valve 20 are in balance when the pressure in space 28 is equal to the pressure in space 30. Thus, the flow control valve 20 will be positioned to regulate the flow therethrough and will maintain the pressure $P_1$ in passage 22 and space 28 equal to the pressure $P_1$ in spaces 30 and 34. Therefore, the pressure in spaces 30 and 34 is maintained equal to the pressure $P_1$ and the pressure balance on servo valve 6 is as follows:

$$P_1 = P_1' - P_2' + P_2$$

or $$P_1 - P_2 = P_1' - P_2'$$

Since the fluid flow rate is a function of the pressure drop $P_1-P_2$, it is also a function of the command signal $P_1'-P_2'$. As previously stated, the configuration of the passage 22 between the points at which $P_1$ and $P_2$ are sensed, determines the relationship between the fluid flow rate and the pressure drop $P_1-P_2$ and the same relationship will exist between flow rate and the command signal $P_1'-P_2'$ because of the relationship set forth above. When the regulator controls the flow of an incompressible fluid, the flow rate is essentially independent of pressure level and is a function only of pressure drop $P_1-P_2$. Thus, the relationship between flow rate and $P_1'-P_2'$ is maintained under conditions of variable supply and/or back pressure. The flow control valve can be in any position when supply pressure $P_s$ is first applied and will quickly assume the position dictated by the command signal.

It is therefore apparent that the regulator of the present invention continually measures and compares the flow rate with the command signal. While the space 34 connects with the flow pressure $P_2$, it could also discharge to a separate drain if the design range for regulated flow requires regulation at a flow which is less than the servo valve flow. The use of a diaphragm actuated servo valve with a maximum displacement of a few thousandths of an inch minimizes changes in volume of the command pressure spaces during changes in command pressures. Hence, the regulator can be used with either hydraulic or pneumatic command pressures in obtaining high speeds of response. If required for dynamic stability, restrictions can be added to the pressure sensing passages 29 and 38 of spaces 28 and 35, respectively, to provide viscous damping for the servo valve and the flow control valve. As the regulator does not require the use of springs, force balance on the valves is not influenced by valve displacement and the relationship $P_1-P_2=P_1'-P_2'$ holds for all values within the design range for $P_1'-P_2'$. If the diaphragm 15 has an effective area which is different from the effective area of piston 36, then $P_1-P_2=C(P_1'-P_2')$ where C is the ratio between the effective area of the diaphragm and the piston. The sizes of the pressurized diaphragm and valve areas can be further manipulated to obtain non-linear relationships between $P_1-P_2$ and $P_1'-P_2'$. Various other modifications are contemplated by those skilled in the art without departing from the spirit and scope of the invention as hereinafter defined by the appended claims.

What is claimed is:

1. A fluid flow regulator comprising a flow control valve located in a fluid passage for controlling the flow therethrough, first sensing means located downstream of said control valve for sensing a pressure $P_1$ in said fluid passage, second sensing means located downstream of said first sensing means for sensing a lower pressure $P_2$ in said passage resulting from the pressure drop in said passage between said sensing means, valve means receiving a command force and connected with the pressure $P_2$ downstream of said control valve for producing a balancing pressure proportional to the sum of the command force and the pressure $P_2$, and means receiving said balancing pressure and connected with the pressure $P_1$ existing upstream of the pressure $P_2$ toward said control valve for positioning said control valve to regulate the pressure $P_1$ so that it is proportional to said balancing pressure, the pressure difference $P_1-P_2$ being proportional to the flow rate through said fluid passage and the flow rate being proportional to the command force.

2. A fluid flow regulator comprising a flow control valve located in a fluid passage for controlling the flow therethrough, first and second means connected with said fluid passage downstream of said control valve and spaced apart to sense a pressure drop $P_1-P_2$ which is a function of flow rate through said fluid passage, valve means receiving a force proportional to a command signal and connected with the pressure $P_2$ for producing a balancing pressure proportional to the sum of the command signal and the pressure $P_2$, and means connected with said pressure $P_1$ and said balancing pressure for positioning said control valve to regulate the pressure $P_1$ so that it is proportional to the balancing pressure.

3. A fluid flow regulator as defined in claim 2 having orifice means located in said fluid passage intermediate said sensing means for producing a pressure drop $P_1-P_2$ substantially proportional to the square of the flow rate.

4. A fluid flow regulator comprising a flow control valve located in a fluid passage connected with a source of fluid at a supply pressure $P_s$, a servo valve comprising movable pressure differential means, first and second pressure sensing conduits connected with said fluid passage downstream of said control valve, said conduits being spaced apart to sense a pressure drop $P_1-P_2$ which is a function of flow rate through said fluid passage, said first conduit being connected with said control valve for applying the pressure $P_1$ to said valve, said second conduit being connected to said servo valve for applying the pressure $P_2$ to one side of said differential means, means for connecting the other side of said differential means with a source of pressure exceeding the pressure $P_1$, means for applying a force to said differential means proportional to a command signal, discharge passage means connected with said other side and regulated by movement of said differential means for providing a balancing pressure on said other side which balances said command signal force and said pressure $P_2$ acting on said differential means, and means connected with said other side for applying said balancing pressure to said control valve in opposition to the pressure $P_1$ in said first conduit to that said control valve is positioned to regulate the pressure $P_1$ so that it is equal to said balancing pressure.

5. A fluid flow regulator comprising a flow control valve located in a fluid passage for controlling the fluid flow rate therethrough, means for introducing to said passage upstream of said valve a fluid at supply pressure $P_s$, conduit means connected with said fluid passage downstream of said control valve for sensing and applying a pressure $P_1$ in one direction to said control valve, a servo valve comprising movable pressure differential means, means connected with said fluid passage downstream of said conduit means for applying a pressure $P_2$ to one side of said differential means, the difference in pressures $P_1$ and $P_2$ being a measure of flow rate through said control valve, means for connecting the other side of said differential means with a source of pressure exceeding the pressure $P_1$, means for applying a force to said differential means proportional to a command signal, discharge passage means connected with said other side and regulated by movement of said differential means to provide a balancing pressure on said other side which balances said command signal force and said pressure $P_2$ acting on said differential means, and means connected with said other side for applying said balancing pressure to said control valve in a direction opposite to that in which pressure $P_1$ is applied, said control valve being positioned by said balancing pressure to regulate the pressure $P_1$ so that it is equal to said balancing pressure and thereby provide a flow rate proportional to the command signal.

6. A fluid flow regulator as defined in claim 5 wherein said command signal force applying means comprises diaphragm means connected with said servo valve and located in a space separated from said differential means, and means for introducing different pressures to opposite sides of said diaphragm means to develop a force on said differential means proportional to said command signal.

7. A fluid flow regulator as defined in claim 5 having an orifice located in said fluid passage between said conduit means for obtaining the pressure $P_1$ and the means for obtaining the pressure $P_2$, said orifice providing a pressure drop $P_1-P_2$ substantially proportional to the square of the flow rate through said fluid passage.

References Cited in the file of this patent

UNITED STATES PATENTS

| | | |
|---|---|---|
| 1,787,686 | Kerr | Jan. 6, 1931 |
| 2,633,869 | Plank | Apr. 7, 1953 |